US012789984B2

(12) United States Patent
Gang et al.

(10) Patent No.: US 12,789,984 B2
(45) Date of Patent: Nov. 10, 2026

(54) LANDING GEAR SYSTEM

(71) Applicant: BETA AIR LLC, South Burlington, VT (US)

(72) Inventors: Travis Maxfield Gang, Shelburne, VT (US); Jeff Wagner, Bridport, VT (US); James David Laughlin, Burlington, VT (US); Louis Gauthier, Bromont (CA); David Brunel, Mirabel (CA); Jack Tulloch, Williston, VT (US); Matthew Tyler Hoyt, Phoenix, AZ (US); Brian J. Brochtrup, Bellevue, WA (US); Brian Reiling, Vashon, WA (US); Shane Holdridge, Monroe, WA (US); Akemi Halali'i Yoshiko Hutchinson, Redmond, WA (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 19/427,120

(22) Filed: Dec. 19, 2025

(65) Prior Publication Data

US 2026/0175970 A1 Jun. 25, 2026

Related U.S. Application Data

(60) Provisional application No. 63/737,460, filed on Dec. 20, 2024.

(51) Int. Cl.

*B64C 25/60* (2006.01)
*B64C 25/16* (2006.01)
*B64C 25/34* (2006.01)
*B64C 25/42* (2006.01)
*B64C 29/00* (2006.01)
*B64D 45/04* (2006.01)
*G01L 5/20* (2006.01)

(52) U.S. Cl.

CPC .............. *B64C 25/60* (2013.01); *B64C 25/16* (2013.01); *B64C 25/34* (2013.01); *B64C 25/42* (2013.01); *B64C 29/00* (2013.01); *B64D 45/04* (2013.01); *G01L 5/20* (2013.01)

(58) Field of Classification Search

CPC ........ B64C 2025/325; B64C 2025/008; B64C 25/12; B64C 25/62; B64C 25/60

See application file for complete search history.

(56) References Cited

U.S. PATENT DOCUMENTS 2,021,325 A * 11/1935 Page, Jr. ................ B64C 25/60 244/103 R 2,621,004 A * 12/1952 Ashton .................. B64C 25/12 244/102 R (Continued)

*Primary Examiner* — Joshua J Michener

*Assistant Examiner* — Michael B. Kreiner

(74) *Attorney, Agent, or Firm* — Lee & Hayes, P.C.

(57) ABSTRACT

Systems and techniques for providing a landing system to an electric aircraft that can support both conventional take-off and landings as well as vertical take-off and landings, while minimizing drag, tire scrub, and camber when landing. The systems and techniques may include a mechanical assembly of a landing gear system. The mechanical assembly may comprise an oleo-pneumatic strut located within a fuselage of the electric aircraft and a suspension assembly housed within fairing(s). The suspension assembly may include a swing arm, a side brace arm, and a kingpin.

20 Claims, 10 Drawing Sheets

(56) References Cited

U.S. PATENT DOCUMENTS

| | | | | | |
|---|---|---|---|---|---|
| 3,384,331 | A * | 5/1968 | Palmer | B64C 25/12<br>244/102 R |
| 3,822,048 | A * | 7/1974 | Hartel | B64C 25/60<br>244/104 R |
| 9,555,877 | B2 * | 1/2017 | Schmidt | B64C 25/26 |
| 9,650,128 | B2 * | 5/2017 | Fenny | B64C 25/18 |
| 11,987,346 | B1 * | 5/2024 | Leung | B64C 25/34 |
| 12,084,169 | B2 * | 9/2024 | Saccoccia | B64C 25/34 |
| 12,330,774 | B1 * | 6/2025 | Hickman | B64C 25/04 |

* cited by examiner

LANDING GEAR SYSTEM

CROSS-REFERENCE TO RELATED APPLICATION

This application claims priority to U.S. Provisional Application No. 63/737,460, filed Dec. 20, 2024, the entire disclosure of which is incorporated herein by reference and for all purposes.

BACKGROUND

Aircraft landing systems may include a swing arm type landing gear system. Conventional swing arm type landing gear systems have inherent tire scrub that can occur. While tire scrub may not impact an aircraft with conventional take-off and landing systems, in aircrafts that support vertical take-off and landings, a wheel outboard scrub can cause the tire to get pushed sideways and potentially skid on the pavement, cause a flat tire, or get ripped off of the aircraft. Tire scrub may also decrease the vertical load carrying capacity. Where an aircraft lands vertically, the wheels may not have forward motion. Accordingly, the lack of forward motion can prevent the rotation of the wheel from accommodating the outboard travel in vertical landings.

Moreover, conventional swing arm type landing gear systems may cause a tire to splay (e.g., angle). In this example, where an aircraft lands vertically, the wheels may not have any forward motion. The splay (e.g., camber) of the tire, can cause wear on the tires when there is forward travel.

Further, while eVTOLs may generally support vertical take-off and landing, it may be beneficial to support convention take-off and landings as well. However, electric VTOL aircrafts may be significantly impacted by drag. Further, eVTOL aircrafts may not have room within a fuselage to fully retract a landing gear system.

SUMMARY

In some examples, the systems and techniques described herein provide a landing system of an aircraft that supports vertical take-off and landing as well as horizontal take-off and landings, while minimizing tire scrub and camber changes during landing.

In some examples, the systems and techniques described herein relate to a mechanical assembly of a landing gear system that may minimize outward travel of a wheel when landing and minimize camber change when landing. In accordance with some of the techniques described herein, the landing system may comprise a strut located within a fuselage of the aircraft and a suspension assembly. The suspension assembly may comprise a swing arm being pivotally coupled to the strut on a first end and external to the fuselage, pivotally coupled to the fuselage at a second end, and pivotally coupled to a kingpin at third end. The suspension assembly may further comprise a side brace arm pivotally coupled to the fuselage at a first end and pivotally coupled to a kingpin at a second end. The suspension assembly may include the kingpin being coupled to a landing wheel assembly comprising a wheel and a brake assembly. The suspension assembly may be configured to enable an upward movement of the wheel along a path near perpendicular to a landing surface.

In an example, the aircraft may include an electric aircraft. The aircraft may include one or more fairings, a fuselage, and a landing system. The landing system may include a strut located within the fuselage of the aircraft. The landing system may also include a suspension assembly configured to enable an upward movement of the wheel along a path near perpendicular to a landing surface. The suspension assembly may comprise a swing arm being pivotally coupled to the strut on a first end and external to the fuselage, pivotally coupled to the fuselage at a second end, and pivotally coupled to a kingpin at third end. The suspension assembly may include a side brace arm pivotally coupled to the fuselage at a first end and pivotally coupled to a kingpin at a second end. The suspension assembly may also include the kingpin being coupled to an axle, the axle being coupled to a wheel included as part of a wheel, tire, brake assembly.

In an example, the techniques may include a landing component of an aircraft. The landing component may comprise: a strut located within a fuselage of the aircraft; and a suspension assembly located external to the fuselage and housed within one or more fairings. The suspension assembly may comprise a swing arm being pivotally coupled to the strut on a first end and external to the fuselage, pivotally coupled to the fuselage at a second end, and pivotally coupled to a kingpin at third end. The suspension assembly may include a side brace arm pivotally coupled to the fuselage at a first end and pivotally coupled to a kingpin at a second end. The suspension assembly may include the kingpin being coupled to an axle, the axle being coupled to a wheel included as part of a wheel, tire, brake assembly. In an example, the landing component is configured to cause the suspension assembly to move an upward movement of the wheel from a first position to a second position along a path near perpendicular to a landing surface with a minimal change along a lateral position of the wheel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
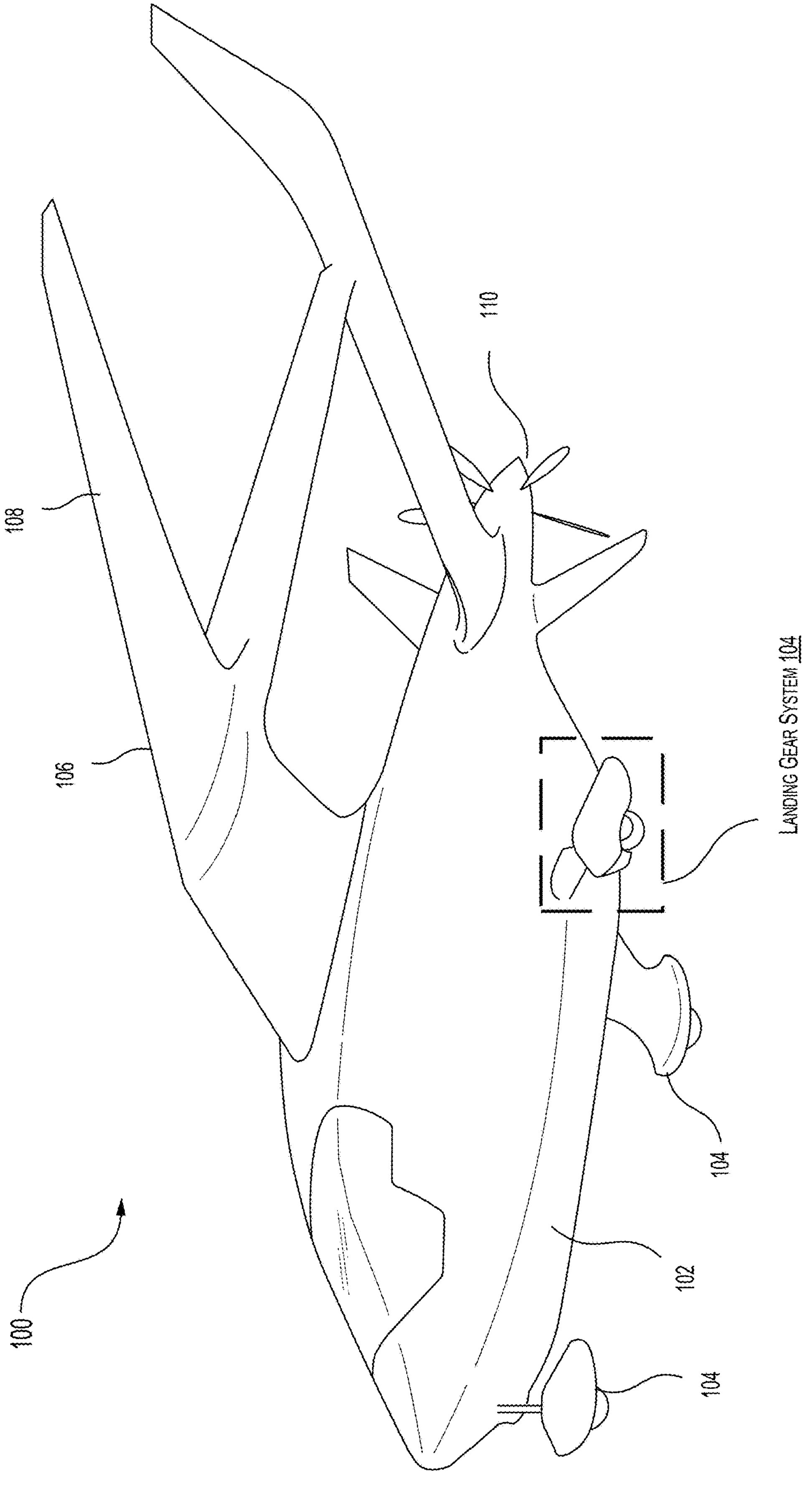
FIG. 1 depicts an example of an aircraft implementing a landing gear system, according to at least one example.

The present description provides systems and techniques related to operating an aircraft, such as an electric aircraft. An example of an electric aircraft that may operate in accordance with the techniques described herein is an electric vertical take-off and landing (eVTOL) aircraft that uses electric power to take-off, hover, and land vertically. However, a person of ordinary skill in the relevant technology will recognize that other types of aircrafts and vehicles (e.g., cars) may use the techniques described herein.

In some examples, the systems and techniques described herein relate to a mechanical assembly of a landing gear system that may minimize outward travel of a wheel when landing and minimize camber change when landing. In accordance with some of the techniques described herein, the landing system may comprise a strut located within a fuselage of the aircraft and a suspension assembly. The suspension assembly may comprise a swing arm being pivotally coupled to the strut on a first end and external to the fuselage, pivotally coupled to the fuselage at a second end, and pivotally coupled to a kingpin at third end. The suspension assembly may further comprise a side brace arm pivotally coupled to the fuselage at a first end and pivotally coupled to a kingpin at a second end. The suspension assembly may include the kingpin being coupled to a landing wheel assembly comprising a wheel and a brake assembly. The suspension assembly may be configured to enable an upward movement of the wheel along a path near perpendicular to a landing surface.

In an example, the aircraft may include an electric aircraft. The aircraft may include one or more fairings, a fuselage, and a landing system. The landing system may include a strut located within the fuselage of the electric aircraft. The landing system may also include a suspension assembly configured to enable an upward movement of the wheel along a path perpendicular or near perpendicular to a landing surface. The suspension assembly may comprise a swing arm being pivotally coupled to the strut on a first end and external to the fuselage, pivotally coupled to the fuselage at a second end, and pivotally coupled to a kingpin at third end. The suspension assembly may include a side brace arm pivotally coupled to the fuselage at a first end and pivotally coupled to a kingpin at a second end. The suspension assembly may include the kingpin being coupled to an axle, the axle being coupled to a wheel included as part of a wheel, tire, brake assembly.

In an example, the techniques may include a landing component of an aircraft. The landing component may comprise: a strut located within a fuselage of the aircraft; and a suspension assembly located external to the fuselage and housed within one or more fairings. The suspension assembly may comprise a swing arm being pivotally coupled to the strut on a first end and external to the fuselage, pivotally coupled to the fuselage at a second end, and pivotally coupled to a kingpin at third end. The suspension assembly may include a side brace arm pivotally coupled to the fuselage at a first end and pivotally coupled to a kingpin at a second end. The suspension assembly may include the kingpin being coupled to an axle, the axle being coupled to a wheel included as part of a wheel, tire, brake assembly. In an example, the landing component is configured to cause the suspension assembly to move an upward movement of the wheel from a first position to a second position along a path near perpendicular to a landing surface with a minimal change along a lateral position of the wheel.

Turning now to the figures, FIG. 1 depicts an example of an electric aircraft 100 implementing a landing gear system, according to at least one example. The electric aircraft 100 may include a vertical takeoff and landing aircraft (eVTOL). As used herein, a vertical take-off and landing (eVTOL) aircraft is one that can hover, take-off, and land vertically. An eVTOL, as used herein, is an electrically powered aircraft typically using an energy source, or a plurality of energy sources, to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generates lift and propulsion by way of one or more powered rotors coupled with an engine, such as a multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight. The eVTOL may be configured to perform horizontal take-off and landing. While the example illustrated in FIG. 1 describes an electric aircraft 100, it is understood that the systems and mechanisms described herein may apply to any aircraft or similar mechanical assembly.

The electric aircraft 100 includes a fuselage 102 with wings 108 extending from the fuselage 102. The wings 108 may include airfoil shapes and support booms that extend along a direction parallel with a length of the fuselage 102 and include lift propulsors 106 to provide lift and propulsion for the electric aircraft. The electric aircraft 100 also includes a propulsor 110 for forward propulsion as well as stabilizers. The wings 108 and stabilizers may provide control surfaces for controlling the attitude of the fuselage 102 during flight.

Propulsors 106 provide vertical propulsion (e.g.). Propulsor 110 may be positioned at a rear of the fuselage 102 and propel the aircraft forward. A lift propulsor is a propulsor 106 that generates lift to propel the aircraft in an upward direction; one of more lift propulsors may be mounted on the front, on the wings 108, at the rear, and/or any suitable location. A propulsor 106, as used herein, is any component or device used to propel a craft by exerting force on a fluid medium, which may include a gaseous medium such as air or a liquid medium such as water. At least a lift propulsor is a propulsor 106 that generates a substantially downward thrust, tending to propel the electric aircraft 100 in a vertical direction providing thrust for maneuvers such as without limitation, vertical take-off, vertical landing, hovering, and/or rotor-based flight, or similar styles of flight.

While shown as a single propulsor at the rear, the propulsor 110 is for propelling an aircraft in a forward direction and may include one or more propulsors mounted on the front, on the wings, at the rear, or a combination of any such positions. At least a forward propulsor may propel the electric aircraft 100 forward for fixed-wing and/or "airplane"-style flight, takeoff, and/or landing, and/or may propel the electric aircraft 100 forward or backward on the ground. The propulsors 106 and the propulsor 110 include a thrust element that may include any device or component that converts the mechanical energy of a motor, for instance in the form of rotational motion of a shaft, into thrust in a fluid medium. The thrust element may include, without limitation, a device using moving or rotating foils, including without limitation one or more rotors, an airscrew or propeller, a set of airscrews or propellers such as contrarotating propellers, a moving or flapping wing, or the like. The thrust element may include, in some examples, a marine propeller or screw, an impeller, a turbine, a pump-jet, a paddle or paddle-based device, or the like.

Propulsors 106 and propulsor 110 may include at least a motor mechanically coupled to the thrust element. The motor may include without limitation, any electric motor, where an electric motor is a device that converts electrical energy into mechanical energy, for instance by causing a shaft to rotate. The motor may be driven by direct current (DC) electric power; for instance, at least a first motor may include a brushed DC at least a first motor, or the like. The motor may also be driven by electric power having varied, or reversing, voltage levels such as alternating current (AC) power as produced by an alternating current generator and/or inverter, or otherwise varying power, such as produced by a switching power source. The propulsors 106 and the propulsor 110 may be coupled to a controller area network (CAN) bus. The CAN bus enables the control units of the propulsors to communicate with a flight controller as well as with the other propulsors and/or other components coupled to the CAN bus.

As shown in FIG. 1, the electric aircraft 100 includes a landing gear system 104. As described in greater detail below, the landing gear system 104 may include a fixed tricycle-style landing gear system. The landing gear system 104 may include one or more assemblies, such as a main landing gear assembly, a nose landing gear assembly, a braking system, wheels, and tires. As described in greater detail below, the main landing gear assembly may include a strut, a side-arm brace, a swing arm, main swing arm fittings, fairings, a wheel-pant (e.g., a fairing covering a wheel, tire, or portion(s) thereof), a kingpin, wheel(s), tire(s), and brake (s). In an embodiment the main landing gear assembly is a swing-arm type configuration. The main landing gear assembly may be non-stowable and may directly couple to the fuselage, such that the main landing gear assembly may extend laterally along an x-axis and downward along a y-axis from the pivot point.

The strut may be an oleo-pneumatic strut (also referred to herein as a shock strut or an oleo strut). An oleo strut may consist of an inner metal tube or piston, which is attached to the wheel axle, and which moves up and down in an outer (or upper) metal tube, or cylinder, that is attached to the airframe. The cavity within the strut and piston is filled with gas (e.g., nitrogen, air, etc.) and oil (e.g., hydraulic fluid), and is divided into two chambers that are coupled by a small orifice of a precise, calculated size. Oleo-pneumatic struts are generally positioned perpendicular or substantially perpendicular to a landing surface to ensure the gas and oil do not mix. In an embodiment, the piston may be coupled to the airframe and the swingarm may be coupled to the cylinder. In this example, the nitrogen within the piston may be on the bottom with the oil being on the top. The oleo-pneumatic strut may comprise a fluid separator to prevent fluid from flowing down into the cavity.

When the aircraft is stationary on the ground, its weight is supported by the compressed gas in the cylinder. During landing, or when the aircraft taxis over bumps, the piston slides up and down relative to the landing surface. This movement compresses the gas, which acts as a spring, and forces oil through the orifice, which acts as a damper. Oleo struts absorb and dissipate forces by converting a portion of the accumulated kinetic energy into thermal energy.

In an embodiment the strut may be housed within the fuselage 102 of the electric aircraft 100. The main landing gear assembly may be designed to enable an upward movement of the wheel along a path that is substantially (e.g., near) perpendicular to a y-axis of a landing surface to minimize outward travel when landing and minimize camber change when landing.

The main landing gear assembly may comprise a pseudo four-bar linkage. In general, a four-bar linkage is a mechanical linkage which consists of four rigid bars coupled by joints or pivots. The four-bar linkage may generally form a closed loop and may be used to achieve controlled and predictable movements, including rotation, translation, and oscillation. The linkage of the main landing gear assembly may comprise a swing arm, a side brace arm, a king pin, and a fuselage of the aircraft 100.

The main landing gear assembly may provide shock absorption when the electric aircraft 100 performs vertical landing or horizontal landing (e.g., conventional landing). Landing loads are transmitted from the ground kingpin, side brace arm, swing arm, and shock strut to the fuselage 102. In an embodiment, a Weight-on-Wheels (WoW) sensor target (and/or a WoW sensor) is installed on each main landing gear assembly to indicate if the aircraft is airborne or on the ground. The WoW sensor target may be coupled to a portion of the swing arm and enclosed within the fuselage. The WOW sensor target may be coupled to any other component (e.g., shock strut, swing arm, side brace arm, etc.) of the main landing gear assembly. The WOW sensor target may interface with a WoW sensor mounted to the fuselage 102. The WoW sensor may be communicatively coupled to a flight control system of the electric aircraft 100, such that the WOW sensor may interface with the flight control system.

In some examples, the electric aircraft 100 may include additional sensors, such as a sensor suite which may include a plurality of sensors that may detect similar or unique phenomena. For example, in a non-limiting embodiment, sensor suite may include a plurality of accelerometers, a combination of accelerometers and gyroscopes, or a combination of one or more of an accelerometer, gyroscope, pressure sensor, and/or torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Figure 2A:
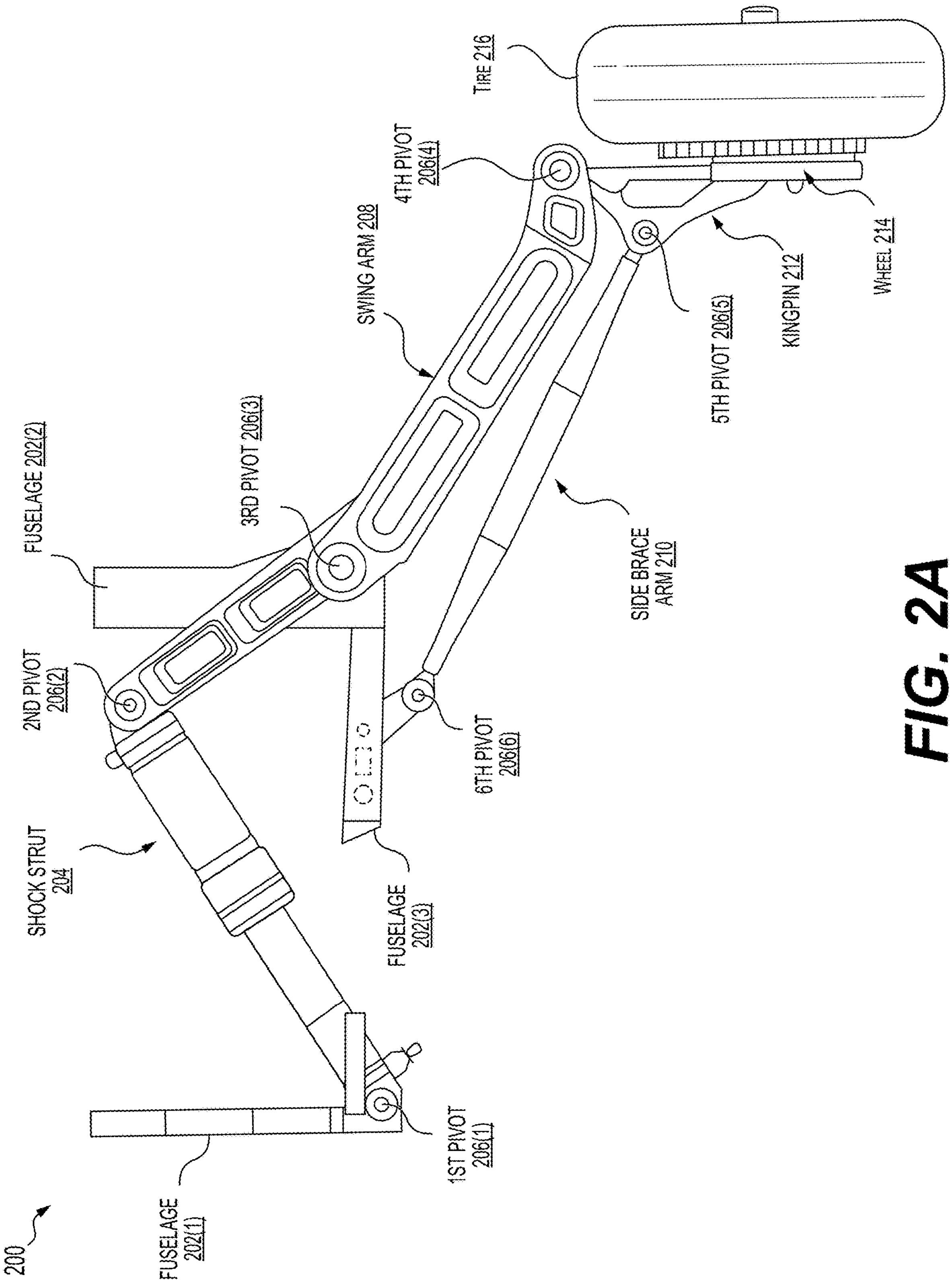
FIGS. 2A and 2B depict an exemplary assembly of the landing gear system, according to at least one example.
Figure 2B:
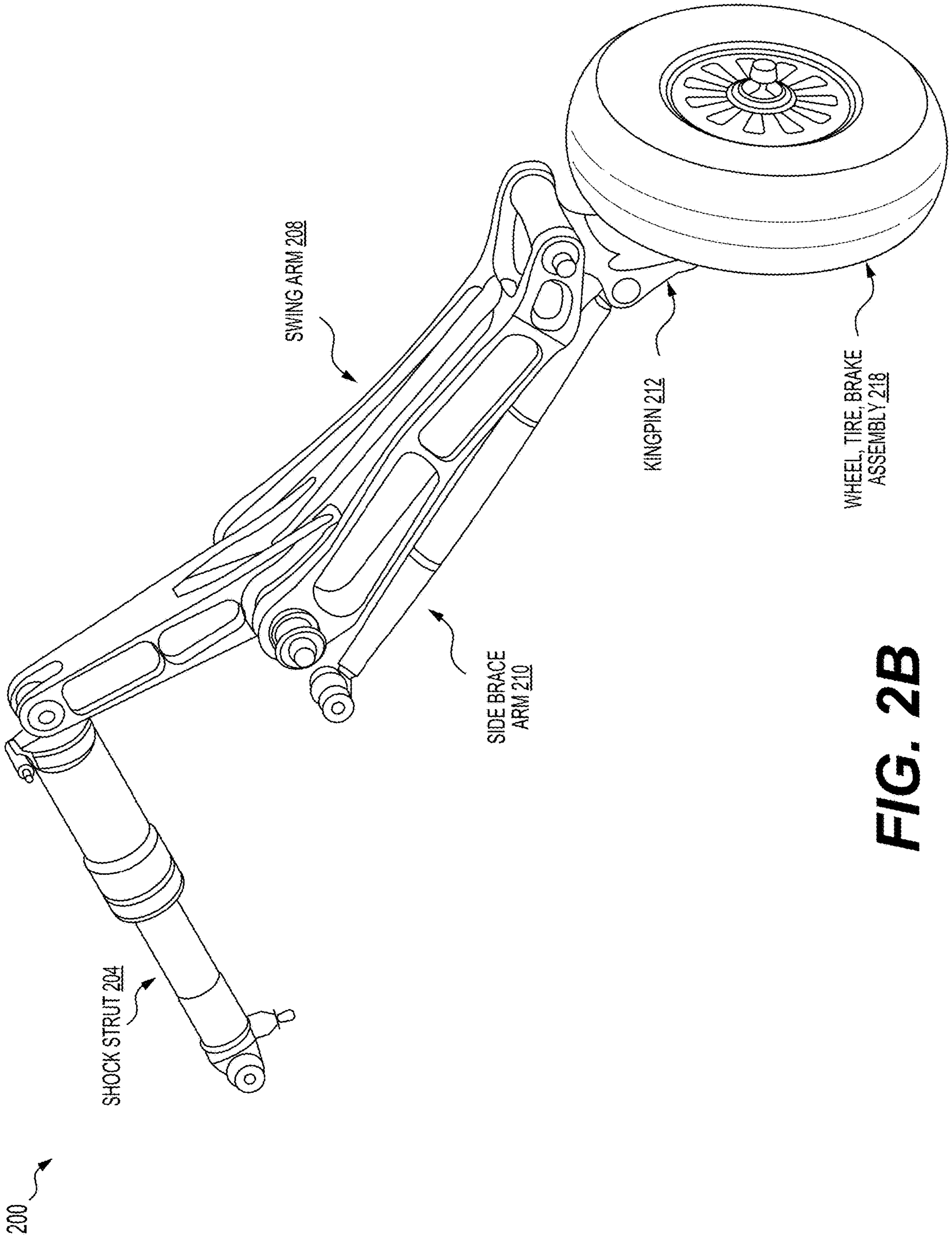

FIGS. 2A and 2B illustrate an assembly 200 of the landing gear system, as described in FIG. 1. As illustrated in FIG. 2A, the assembly 200 may comprise a shock strut 204, swing arm 208, side brace arm 210, and kingpin 212. The components of the assembly 200 may be coupled via pivot(s) 206. Pivot(s) 206 may comprise any type of mechanical pivot. In an embodiment, pivot(s) 206 may represent trunnion pin(s), pin(s), bolt(s), or any other type of fastener.

The shock strut 204 may comprise an internal oleo-pneumatic strut opposing a lever arm supporting the wheel. The shock strut 204 may be housed within the fuselage 202. Accordingly, by housing the shock strut 204 within the fuselage 202, the assembly 200 may minimize the size and number of components exterior to the fuselage 202. The assembly may thus minimize drag while protecting the shock strut 204 from harsh environmental conditions (e.g., temperature extremes, foreign objects, e.g., rock chips, etc.), thereby extending the life of the shock strut 204.

Moreover, in conventional four-bar linkage landing gears, an oleo-pneumatic strut may be included as part of a retractable landing gear or may be located outboard of the fuselage. In both of these examples, aerodynamics and drag is not a concern or focus. However, as noted above, with electric aircrafts, drag may significantly impact aircraft range of the eVTOL. Accordingly, by positioning the shock strut 204 within the fuselage 202, the assembly 200 may provide reduced drag for a landing gear system that may not fully retract, thereby improving battery life (and thus, the aircraft range) of the electric aircraft.

A first end of the shock strut 204 may be coupled to a first portion of the fuselage 202(1) via a first pivot 206(1). A second end of the shock strut 204 may be coupled to a first end of swing arm 208 via a second pivot 206(2). A second portion of the swing arm 208 may be coupled to a second portion of the fuselage 202(2) via third pivot 206(3). A second end of the swing arm 208 may be coupled to a first end of the kingpin 212 via fourth pivot 206(4). A second portion of the kingpin 212 may be coupled at a first end of side brace arm 210 via a fifth pivot 206(5). A second end of the side brace arm 210 may be coupled to a third portion of the fuselage 202(3) via a sixth pivot 206(6).

As illustrated, the shock strut 204 may be angled at an incline relative to a lateral surface of fuselage 202(3), as shown in the assembly 200. Accordingly, the shock strut 204 may be angled such that the shock strut 204 may include a separator between oil and gas within the strut. Accordingly, the shock strut may not be positioned vertically (e.g., perpendicular to the y-axis) or substantially vertical (e.g., substantially perpendicular to the y-axis such that a separator between the oil and water in the shock strut 204 is not needed).

In the illustrative example, the distance between fourth pivot 206(4) and fifth pivot 206(5) is minimized in order to reduce the size of the front profile of the landing gear system and reduce drag during flight.

The assembly 200 may also include a wheel 214 and a tire 216. The wheel 214 may couple to the electric aircraft 100 via an axle, retained by a fastener (e.g., such as an axle nut). The kingpin 212 may couple to an axle included as part of a wheel, tire, brake assembly 218 at a second end of the kingpin 212. The wheel, tire, brake assembly 218 may include the axle and rotational components for coupling to the wheel 214. In general, a kingpin may impact the camber of the wheel 214 and the tire 216. As noted above, conventional swing arm type landing gear systems have inherent tire scrub that can occur. While tire scrub may not impact an aircraft with conventional take-off and landing systems, in aircrafts that support vertical take-off and landings, a wheel outboard scrub can cause the tire to get pushed sideways and potentially skid on the pavement, cause a flat tire, or get ripped off of the aircraft. Tire scrub may also decrease the vertical load carrying capacity. Where an aircraft lands vertically, the wheels may not have forward motion. Accordingly, the lack of forward motion can prevent the rotation of the wheel from accommodating the outboard travel in vertical landings.

Moreover, conventional swing arm type landing gear systems may cause a tire to splay (e.g., angle). In this example, where an aircraft lands vertically, the wheels may not have any forward motion. The splay (e.g., camber) of the tire, can cause wear on the tires when there is forward travel.

Thus, the assembly 200A may be optimized to balance between scrub and camber of the tire 216 and the wheel 214. In an embodiment, the illustrated assembly 200A may be updated to selectively optimize more for camber or more for scrub based on needs of an aircraft.

FIG. 2B, illustrates an example view 200B of the assembly 200A described in FIG. 2A. As illustrated, FIG. 2B may correspond to an example view 200B of the assembly 200A without the fuselage 202 of FIG. 2A. As illustrated in FIG. 2B, the assembly may include a wheel, tire, and brake assembly 218. In an embodiment, the brakes of the electric aircraft 100 are used to decelerate the aircraft and for low-speed steering via differential actuation. In an embodiment, the brakes may comprise brake lines comprising titanium or steel coil tubes that surround the pivot points. The titanium or steel coil tubes may be more reliable than flexible hose. In an embodiment, the titanium coil tubes may be lighter and can be more tightly coiled around the pivot(s), such that aerodynamics of the landing gear system may be improved. In an embodiment, the swing arm 208 may comprise a metal alloy material. In an illustrative embodiment, the swing arm 208 may comprise a 7050-T7451 plate. In this example, the swing arm 208 may include a finish comprising Alodine, a primary and a topcoat. In an embodiment, the kingpin 212 may comprise a metal alloy material. In an illustrative embodiment, the kingpin 212 may comprise a 7050-T7451 plate. In this example, the kingpin 212 may include a finish comprising Alodine, a primary and a topcoat. Accordingly, the assembly may provide a pseudo-4 bar linkage that may minimize tire scrub and camber change for electric aircrafts that support both vertical take-off and landings, as well as conventional take-off and landings.

Figure 3A:
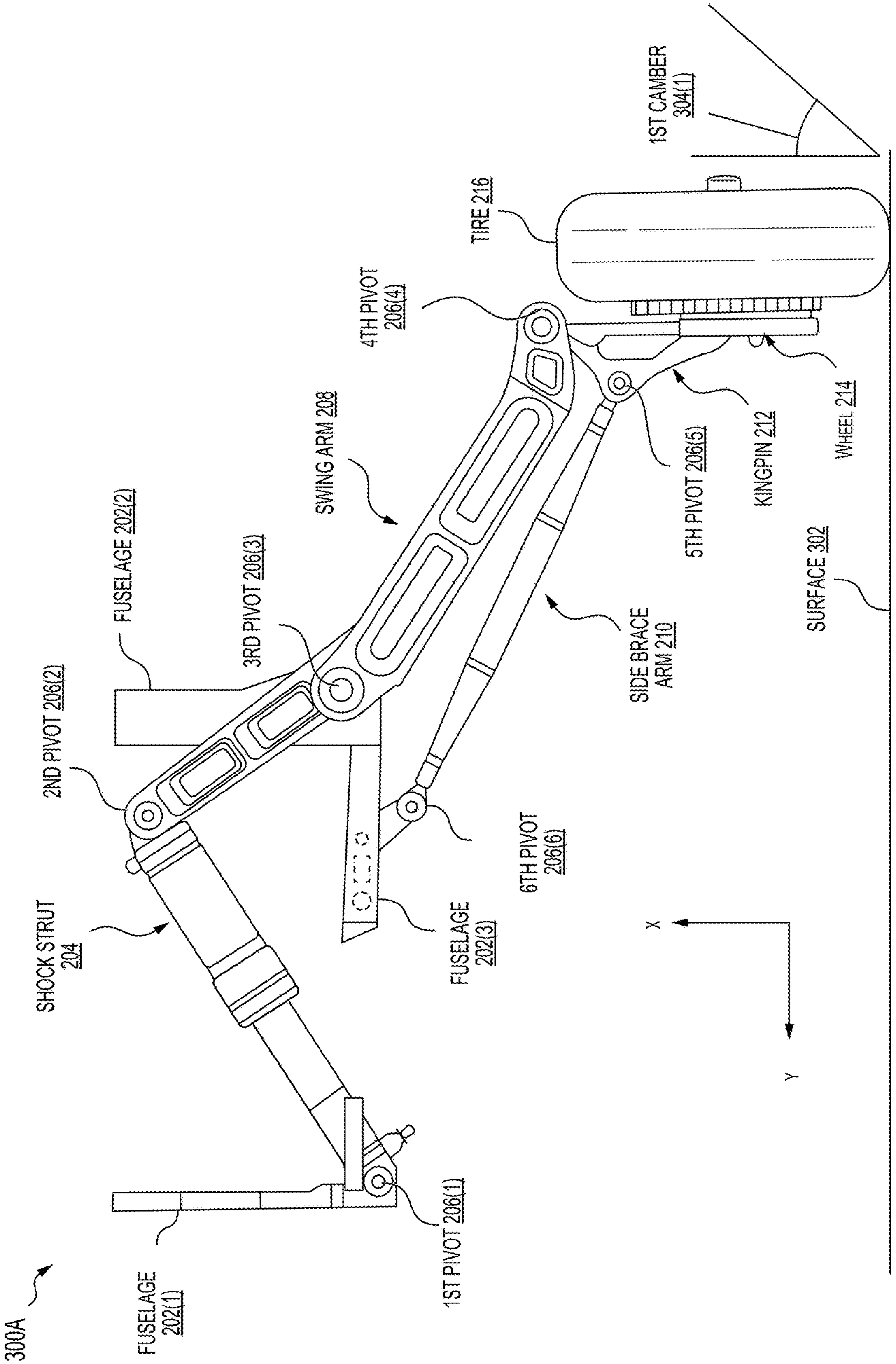
FIGS. 3A-3C depict exemplary views of components of the landing gear system in a first position and a second position.
Figure 3B:
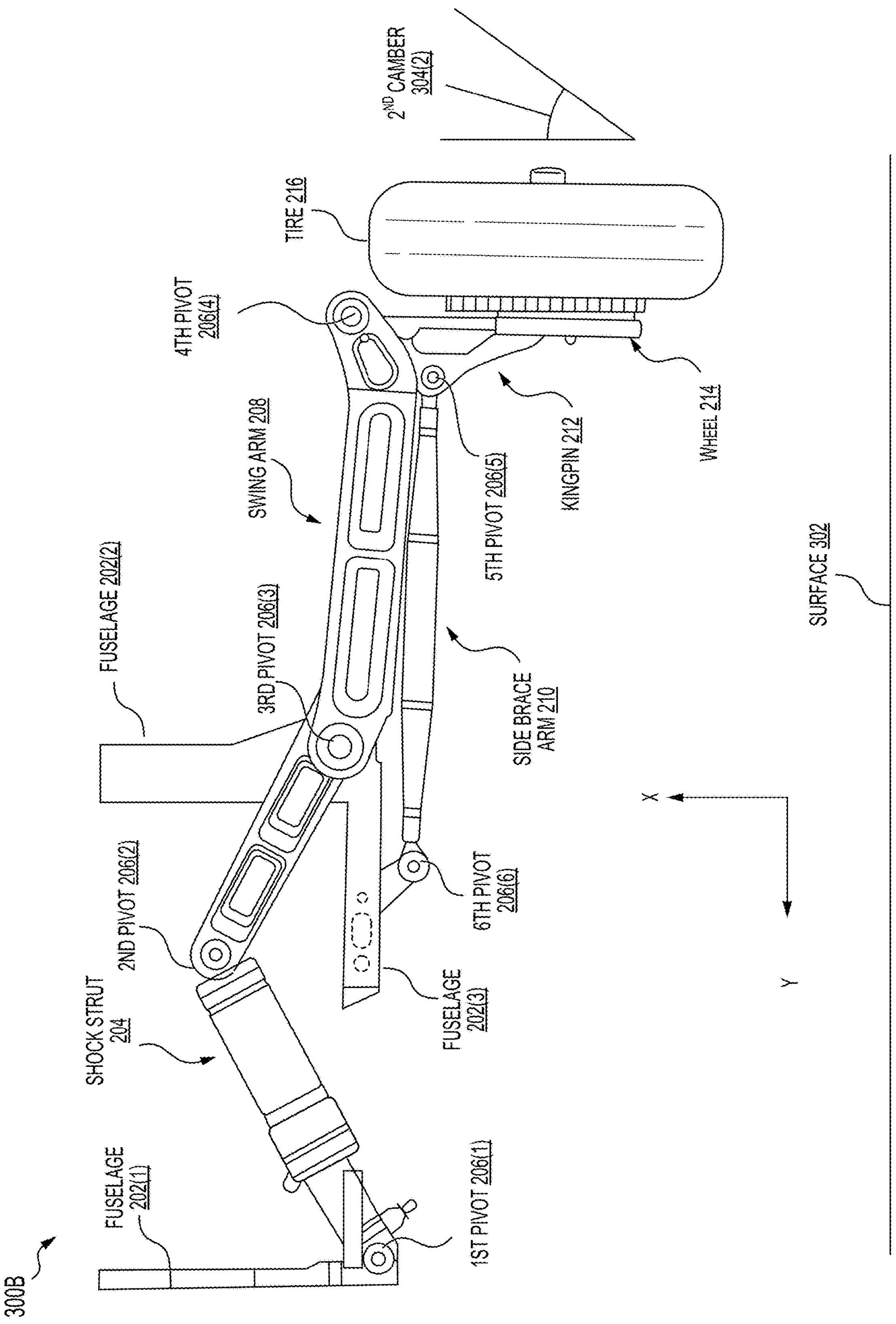
Figure 3C:
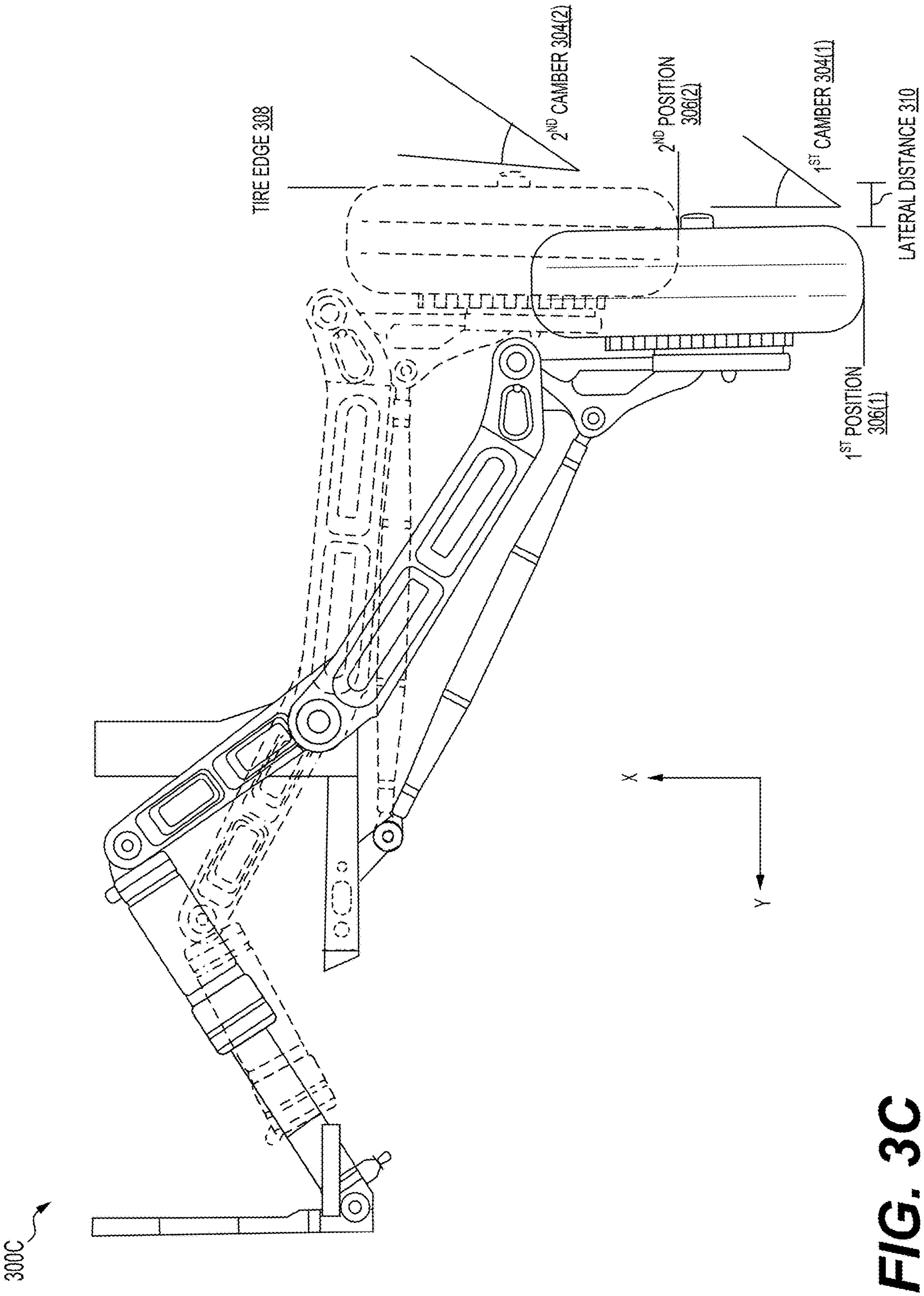

FIGS. 3A-3C depict an example of components of the landing gear system moving between a first position and a second position, according to examples described herein.

FIG. 3A depicts an exemplary assembly of the landing gear system in a first position 300A. The assembly may include a shock strut 204, swing arm 208, side brace arm 210, and kingpin 212. The landing gear system may further include tire 216 and wheel 214. The first position 300A may correspond to an extended position of the landing gear system. For instance, the extended position may represent when the aircraft is in flight, preparing for a vertical landing or a conventional landing, and/or in an unweighted position. While the illustrative embodiment shows the tire 216 in contact with a surface 302, it is understood that the first position 300A does not require the tire to be in contact with a surface 302. Surface 302 may correspond to a landing surface of an aircraft.

In the first position 300A the shock strut 204 may be in a first state. In an embodiment the first state may correspond to a relaxed or extended state between the first pivot 206(1) and the second pivot 206(2). The shock strut 204 may be positioned at an angle relative to an x-axis, such that the shock strut is not perpendicular or substantially perpendicular. A first portion of the swing arm 208 that is coupled at the second pivot 206(2) and the third pivot 206(3) may be angled relative to the x-axis. A second portion of the swing arm 208 may extend from the third pivot to the fourth pivot at an angle, such that the fourth pivot end may be parallel to the surface 302 or a y-axis. The side brace arm 210 may extend from the fifth pivot 206(5) to the sixth pivot 206(6) at an angle relative to an x-axis, such that side brace arm 210 is not parallel or substantially parallel to the y-axis. The kingpin 212 may, on a first side be parallel to an x-axis. The first side of the kingpin 212 may be coupled to the wheel 214. In the first position 300A the wheel 214 and/or tire 216 may have a first camber 304(1). The first camber 304(1) may be an angle of the tire relative to the surface 302. In an embodiment, the first camber 304(1) may correspond to an angle perpendicular or substantially perpendicular to the surface 302.

FIG. 3B depicts an exemplary assembly of the landing gear system in a second position 300B, with reference to FIGS. 1-3A. The second position 300B may correspond to a compressed position. In an embodiment, the second position 300B may represent when the landing gear system bears weight (e.g., such as after a landing). In another embodiment, the second position 300B may correspond to a flight position of the landing gear system, such as when the aircraft is in flight.

In the second position 300B, the shock strut 204 may be in a second state. In an embodiment the second state may correspond to a compressed state between the first pivot 206(1) and the second pivot 206(2). The shock strut 204 may be positioned at an angle relative to an x-axis, such that the shock strut is not perpendicular or substantially perpendicular. A first portion of the swing arm 208 that is coupled at the second pivot 206(2) and the third pivot 206(3) may be angled relative to the x-axis. In the second position 300B, the first portion of the swing arm 208 may move in a downward, lateral direction (e.g., towards a y-axis) in response to the shock strut 204 compressing. A second portion of the swing arm 208 may extend from the third pivot to the fourth pivot, such that the second portion of the swing arm 208 is substantially parallel to a y-axis. The side brace arm 210 may extend from the fifth pivot 206(5) to the sixth pivot 206(6), such that the side brace arm 210 is substantially parallel to the y-axis. The kingpin 212 may, on a first side be angled relative to the x-axis. The first side of the kingpin 212 may be coupled to the axle, the axle being couple to the wheel 214. In the second position 300B the wheel 214 and/or tire 216 may have a second camber 304(1). The second camber 304(1) may be an angle of the tire relative to the surface 302. In an embodiment, the second camber 304(1) may correspond to an angle that is different than the first camber 304(1).

FIG. 3C depicts the exemplary assemblies 300C of the landing gear system in the first position 300A and the second position 300B, with reference to FIGS. 1-3B. In addition to the components described in FIGS. 3A and 3B, the exemplary assemblies 300C include the first position 306(1), the second position 306(2), tire edge 308, and lateral distance 310. In the illustrated example, as the landing gear assembly moves from the first position 306(1) to the second position 306(2), the tire edge 308 may extend laterally along a y-axis by a lateral distance 310. As noted above, the lateral distance 310 may be minimized, such that tire scrub and camber changes between the first position 306(1) and the second position 306(2) are minimized.

Figure 4:
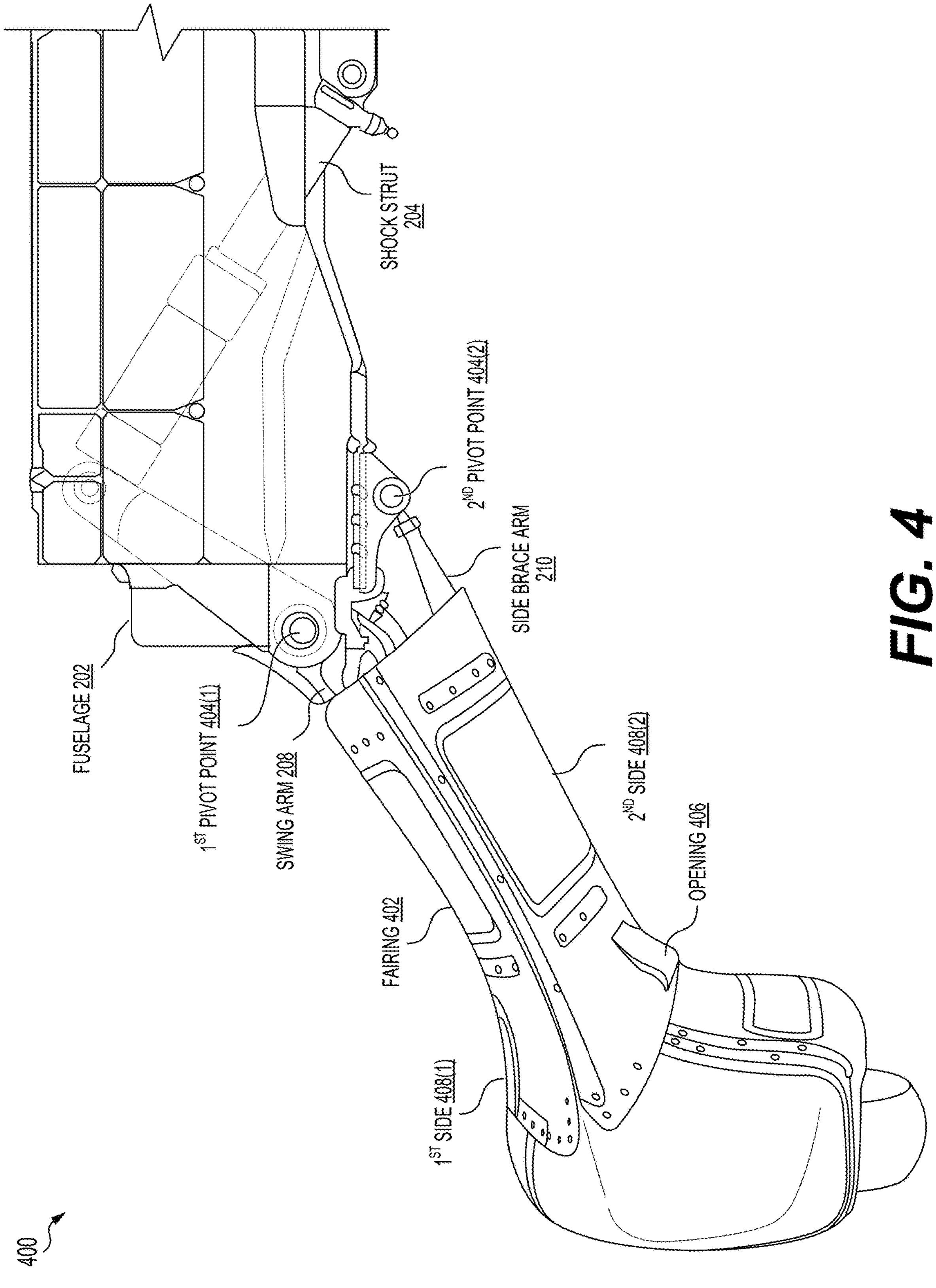
FIG. 4 depicts an example of fairings of the MGL system coupling to the fuselage, according to at least one example.

FIG. 4 depicts an example 400 of fairings of the landing gear system coupling to the fuselage, according to at least one example. As illustrated, the example 400 may include fuselage 202, shock strut 204, and side brace arm 210. As noted above, the shock strut 204 may be housed within the fuselage 202. The swing arm 208, side brace arm 210, kingpin, and tire, brake, and wheel assembly may be external to the fuselage. Accordingly, in order to reduce drag, the external components may be housed within fairing 402. In an embodiment, the fairing 402 may comprise a fiberglass material or a composite material. The fairings 402 may be constructed of multiple pieces that provide a streamlined, low drag profile in flight and support the articulation of the landing gear system when on the ground and/or in the second position 306(2). The fairing 402 may be coupled to the landing gear system. For instance, one or more segments of the fairing 402 may be coupled to the landing gear system using fasteners. In an embodiment, the fairing 402 may be removed in segment(s) via the fasteners. In an alternative embodiment, the fairing 402 may be removed as a single piece via the fasteners. The fasteners may enable easy removal of the fairing 402 (e.g., as a whole or in segment(s)) for service and inspection of the landing gear system.

The fairing 402 may include an opening 406 located on a second side 408(2) of the fairing 402. In an embodiment, the opening 406 may open in a downward direction, in order to make room for the side brace arm 210 when the landing gear system lands. In an embodiment, each segment of the fairing 402 may be configured to be kept as tight as possible to the surface of each component of the landing gear system that it covers, as the landing gear system moves between the first position and the second position. By keeping the distance between segments of the fairing 402 low, while ensuring that the segments do not clash or hit one another during flight or during landing, the fairing 402 may provide a durable mechanism to protect the landing gear system components while reducing drag.

In the example 400 of FIG. 4, the fuselage 202 may be coupled to the landing gear system. For instance, the fuselage 202 may be coupled to the landing gear system at one or more pivot point(s) 404. For instance, a first pivot point 404(1) may couple a first portion of the fuselage 202 to the swing arm 208. A second pivot point 404(2) may couple a second portion of the fuselage 202 to the side brace arm 210. Additional or alternative pivot point(s) may be used to couple the fuselage to the landing gear system. Accordingly, the example 400 is not limiting.

Figure 5:
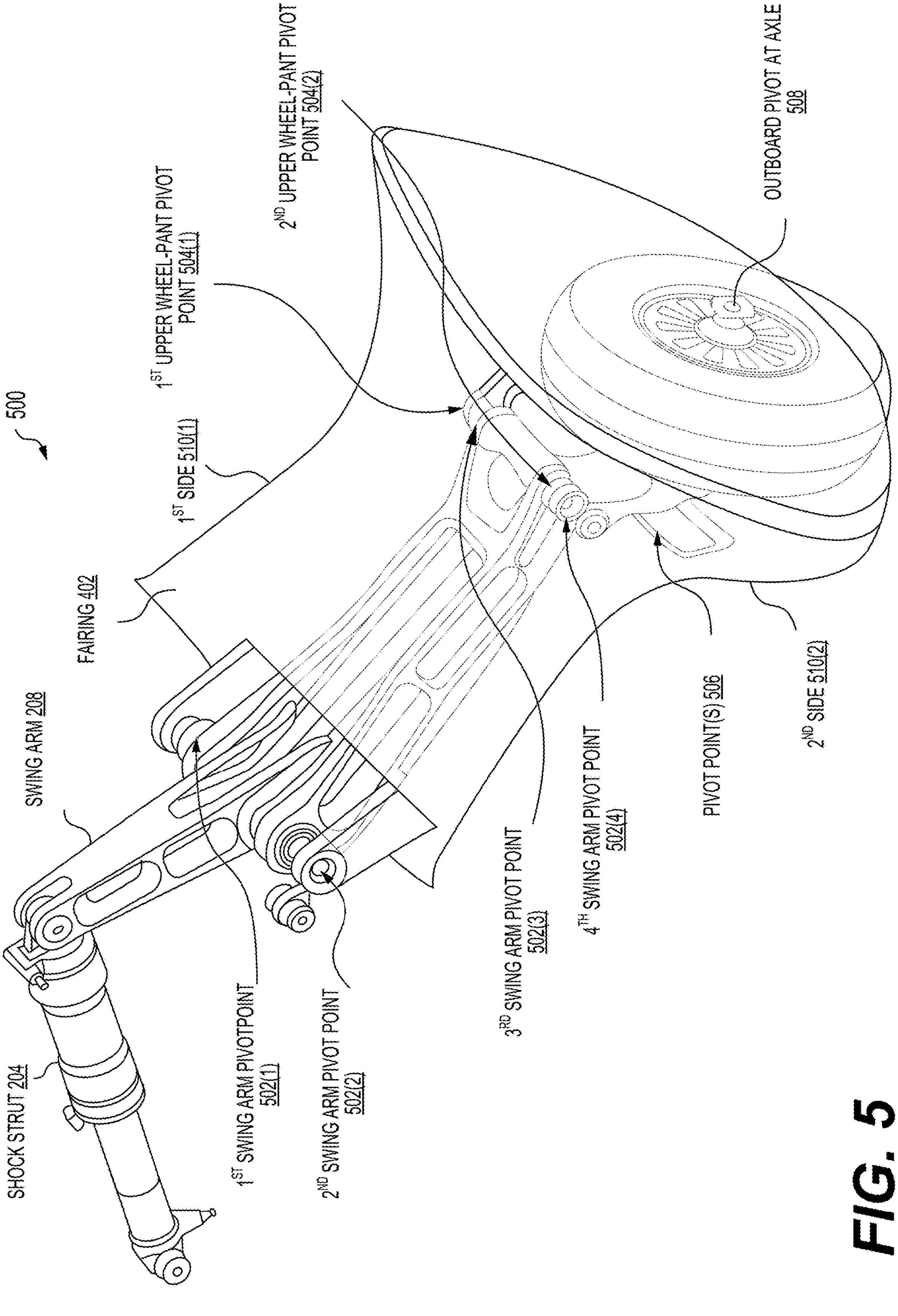
FIG. 5 depicts an example of pivot points between the landing gear system and the fairing, according to at least one example.

FIG. 5 depicts an example 500 of pivot points between the landing gear system and a portion of the fairing, according to at least one example. The example 500 shown in FIG. 5 may represent one or more segments of the fairing 402. While not illustrated in the example 500, the fairing 402 may include bracket(s) and/or rib(s) that may be used to couple the segments of the fairing 402 to the landing gear system.

In an embodiment, the fairing 402 may include segments separated at a pivot point between the swing arm and the kingpin and the wheel-pant (e.g., portion of the fairing 402 covering portion(s) of the wheel, tire, brake assembly 218. The swing arm fairing segment may be coupled to the landing gear system via swing arm pivot point(s) 502 (e.g., such as pivot(s)). For instance, a first portion of the fairing 402 may couple to a portion of the swing arm 208 at first swing arm pivot point 502(1). A second portion of the fairing 402 may couple to a second portion of the swing arm 208 at second swing arm pivot point 502(2). A third portion of the fairing 402 may couple to a second portion of the swing arm 208 at a third swing arm pivot point 502(3). A fourth portion of the fairing 402 may couple to a fourth portion of the swing arm 208 (e.g., such as the second end of the swing arm 208) at a fourth swing arm pivot point 502(4). In an embodiment, the swing arm fairing may be coupled at the third swing arm pivot point 502(3) and/or the fourth swing arm pivot point 502(4) between a fastener (e.g., a trunnion pin, etc.), and the pivot point between the second end of the swing arm 208 and the kingpin 212.

In an embodiment, a wheel-pant may be coupled to the landing gear system at one or more pivot points. For instance, the wheel-pant may be coupled at the pivot point between the second end of the swing arm 208 and the kingpin 212, an inboard side of the kingpin, and/or at an axle. In the example 500, the wheel-pant may be coupled to the landing gear system at a first upper wheel-pant pivot point 504(1) and a second upper wheel-pant pivot point 504(2). In an embodiment, the first upper wheel-pant pivot point 504(1) and the second upper wheel-pant pivot point 504(2) may couple to one or more ribs that extend perpendicular to the tire. A brace may couple the one or more ribs and may be parallel with the tire. In an embodiment, the first upper wheel-pant pivot point 504(1) and the second upper wheel-pant pivot point 504(2) may attach to a bracket coupled to an upper axis of the kingpin 212. Portions of the wheel-pant may also couple to the landing gear system via the outboard attachment at the axle. Portions (upper or lower) of the wheel-pant may couple to the landing gear system via one or more additional outboard pivot point(s) or inboard pivot point(s) 506. In an embodiment, an inboard pivot point may correspond to a portion of the kingpin 212. An outboard pivot point may correspond to the axle and/or attaching to ears of the axle via pivot(s) and/or fastener(s).

Figure 6C:
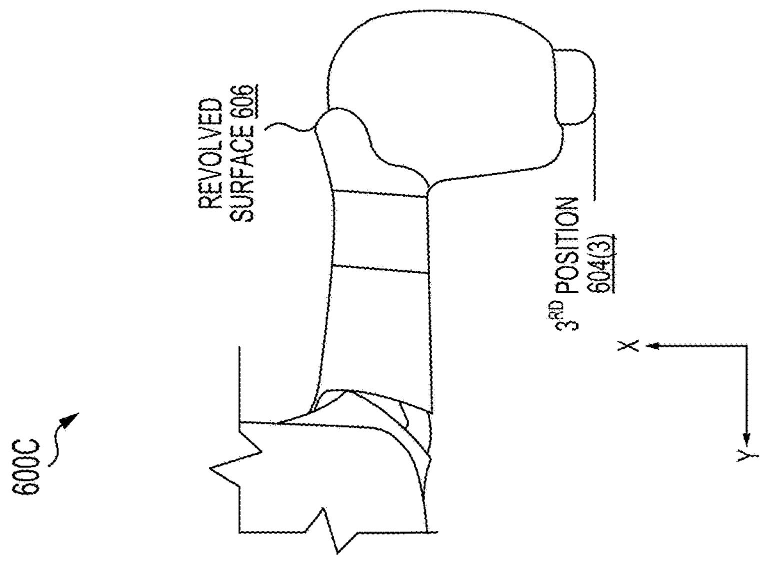
FIGS. 6A-6F depict an example illustration of movement of the fairings and the landing gear system, according to at least one example.
Figure 6B:
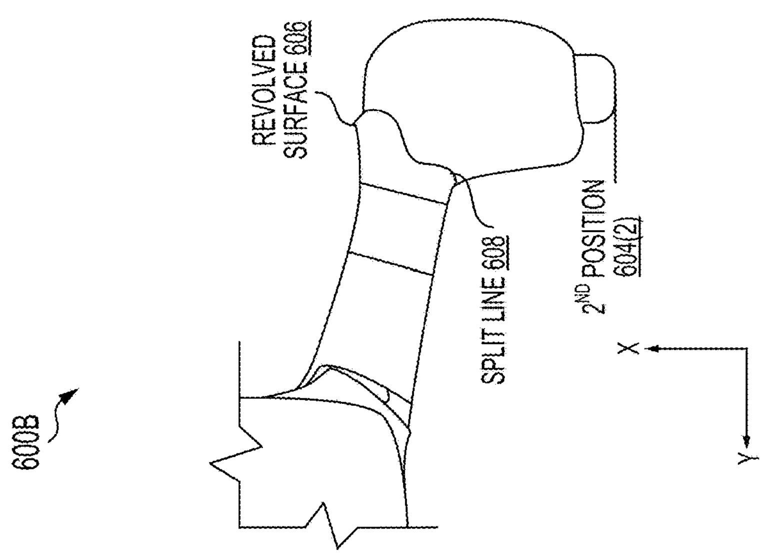
Figure 6A:
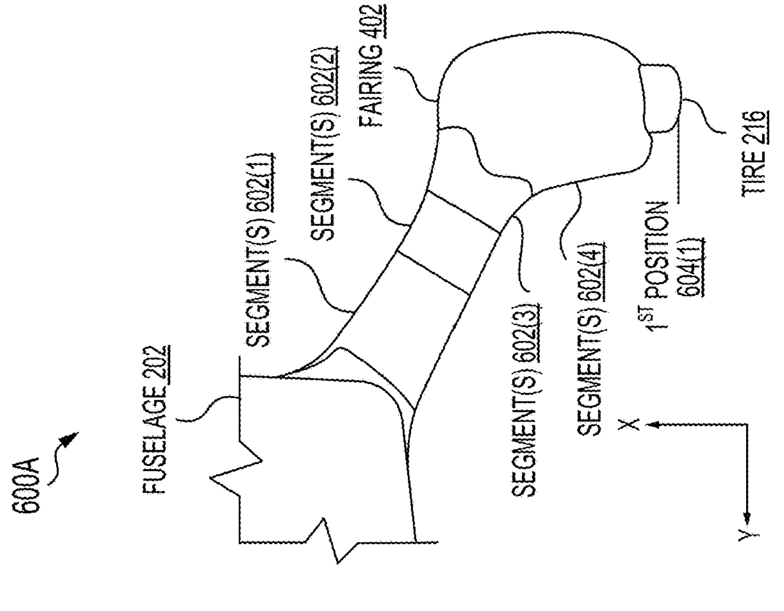
Figure 6F:
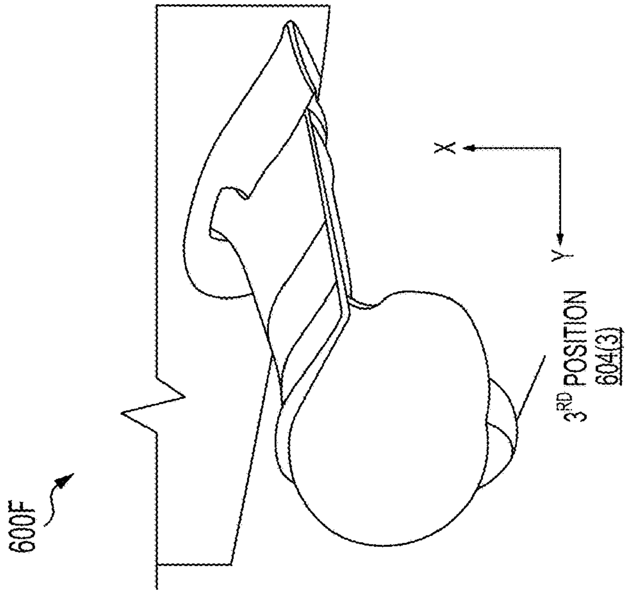
Figure 6E:
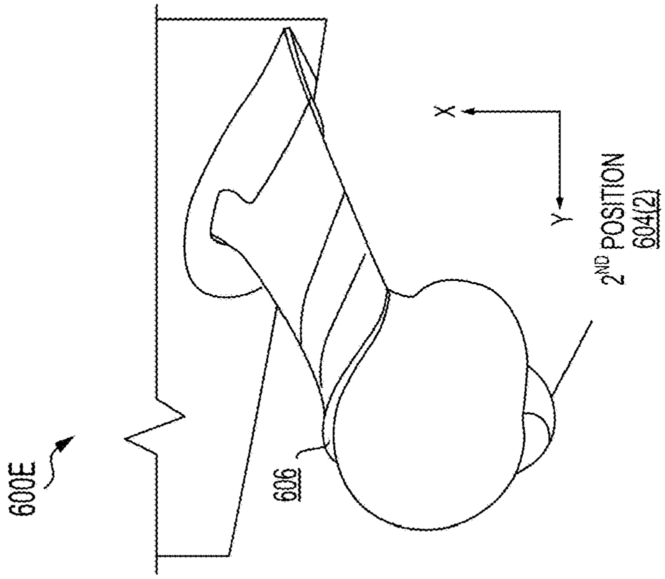
Figure 6D:
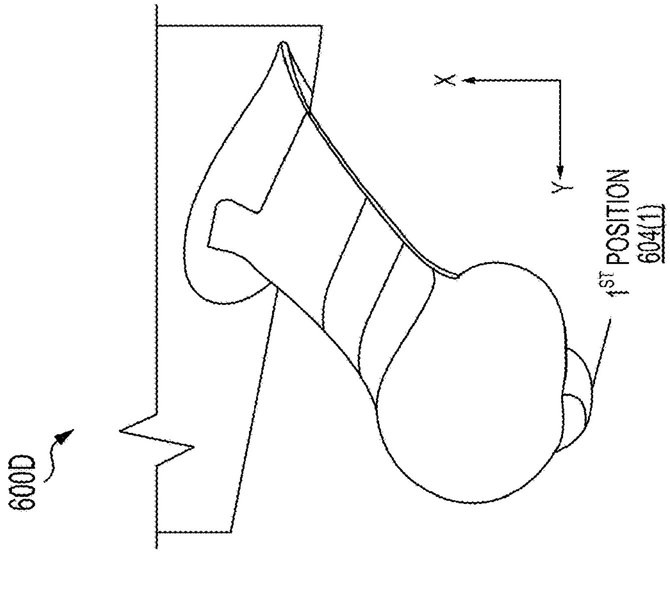

FIGS. 6A-6F depict an example sequence illustrating movement of the fairings and the landing gear system, according to at least one example. FIGS. 6A-6C illustrate an example flow from a first view of the fairing 402 moving from a first position 604(1) to a second position 604(2) and a third position 604(3). FIGS. 6D-6F illustrate an example flow from a second view of the fairing 402 moving from the first position 604(1) to the second position 604(2) and the third position 604(3).

As illustrated in FIG. 6A, an embodiment 600A may include fuselage 202, fairing 402, and tire 216. The LANDING GEAR system external to the fuselage 202 may be covered by the fairing 402. The fairing 402 may comprise one or more segment(s) 602. The landing gear system may be assembled in a first position 604(1). The first position 604(1) may correspond to an extended position and/or an unweighted position of the electric aircraft 100. As noted above, each segment(s) 602 may comprise a fiberglass material. The segments 602 may be coupled to the landing gear system to provide a streamlined, low drag profile in flight and support the articulation of the landing gear system when on the ground. For instance, edges of the segment(s) 602 may overlap, such that space between a first segment 602(1) and a second segment 602(2) is minimized to reduce drag during flight. The fairing 402 may attach to the landing gear system via fasteners that allow it to be easily removed for service and inspection of the landing gear system.

FIG. 6B illustrates example 600B of the landing gear system and fairing 402 in a second position 604(2). The second position 604(2) may be an intermediate position between the first position 604(1) and third position 604(3). For instance, the intermediate position may correspond to a partially compressed state of the shock strut 204. As illustrated in the example 600B, the tire 216 has moved vertically along an x-axis relative to the first position 604(1). As the landing gear system has moved from the first position to the second position, a revolved surface 606 of one or more of the segment(s) 602 may be visible. In an embodiment, each segment 602 may comprise one or more revolved surface(s) 606 that enable the edge(s) of the segments 602 to closely fit together during flight without crashing into one another or breaking during landing. Moreover, the example 600B includes split line 608. In an embodiment, the split line is located on a portion of the fairing 402 that covers the swing arm. As the landing gear system moves from the first position 604(1) to the third position 604(3), the split line 608 may pull away (e.g., move in a downward vertical direction along an x-axis relative to segment 604(4)) from an inner wall of the segment 604(4) (e.g., the wheel-pant). In an embodiment, the split line 608 may represent opening 406.

FIG. 6C illustrates example 600C of the landing gear system and fairing 402 in a third position 604(3). The third position 604(3) may represent a compressed state of the shock strut 204. The third position 604(3) may correspond to the second position 306(2) described herein. As illustrated in the example 600C, the tire 216 has moved nearly vertically along an x-axis relative to the first position 604(1) and the second position 604(2). As the landing gear system has moved from the second position to the third position, the revolved surface 606 of one or more of the segment(s) 602 may be visible. In an embodiment, the split line 608 may have moved along a downward and/or lateral path relative to segment 602(4), in order to provide space for the swing arm as weight is applied to the landing gear system (e.g., such as during landing).

FIG. 6D illustrates example 600D of the landing gear system and fairings 402 in the first position 604(1) according to a second view. As illustrated, the segment(s) 602 are tightly fitted to reduce drag during flight. FIG. 6E illustrated example 600E of the landing gear system and fairings 402 according to a second view. The example 600E illustrates the landing gear system in the second position 604(2). As illustrated, as the landing gear system moves from the first position 604(1) to the second position 604(2), the segment (s) 602 may shift and/or move with the landing gear system components. As the segment(s) 602 move, the revolved surface(s) 606 of one or more of the segments 602 may become visible. In the illustrated example, 600E, as the shock strut 204 compresses, segment 602(3) may move in a lateral direction along a y-axis and vertically along an x-axis, such that an edge of the segment 602(3) corresponding to the revolved surface 606 overlaps with a portion of segment 602(4). FIG. 6F illustrates example 600F of the landing gear and fairing 402 according to the second view. The example 600F corresponds to the third position 604(3). The third position 604(3) may correspond to the second position 306(2) described herein. As illustrated in the example 600F, the tire 216 has moved vertically along an x-axis relative to the first position 604(1) and the second position 604(2). As the landing gear system has moved from the second position to the third position, the revolved surface 606 may become more visible as the segment 602(3) overlaps with segment 604(4). In an embodiment, the split line 608 may move along a downward and/or lateral path relative to segment 602(4), in order to provide space for the swing arm as weight is applied to the landing gear system (e.g., such as during landing).

CONCLUSION

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Additionally, those having ordinary skill in the art readily recognize that the techniques described above can be used in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this description.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A landing system of an aircraft configured to minimize camber and tire scrub, the landing system comprising: a strut located within a fuselage of the aircraft; and a suspension assembly comprising: a swing arm being pivotally coupled to the strut on a first end and external to the fuselage, pivotally coupled to the fuselage at a second end, and pivotably coupled to a kingpin at third end; a side brace arm pivotally coupled to the fuselage at a first end and pivotally coupled to a kingpin at a second end; and the kingpin being coupled to a landing wheel assembly comprising a wheel and a brake assembly, wherein the suspension assembly is configured to enable an upward movement of the wheel along a path near perpendicular to a landing surface.

B: The landing system of paragraph A, wherein the strut comprises an oleo-pneumatic strut.

C: The landing system of paragraphs A-B, wherein the landing system is positionable in a first position to a second position.

D: The landing system of any of paragraph A-C, wherein the first position comprises an extended position, wherein: the strut is angled at an incline relative to an x-axis and the landing surface; a first portion of the swing arm between the first end of the swing arm and the second end of the swing arm being angled at a second incline relative to the x-axis and the landing surface, a second portion of the swing arm extending in a downward and lateral direction relative to the x-axis from the second end of the swing arm to the third end of the swing arm; the side brace arm extending from the first end of the side brace arm to the second end of the side brace arm at a lateral and downward angle relative to the landing surface; and a side of the kingpin being perpendicular to the landing surface.

E: The landing system of any of paragraphs A-D, wherein the second position comprises a compressed position, wherein: the strut is compressed in a downward and angled direction relative to an x-axis and the landing surface; a first portion of the swing arm between the first end of the swing arm and the second end of the swing arm being angled in a downward and lateral direction relative to the x-axis and the landing surface, a second portion of the swing arm extending from the second end of the swing arm to the third end of the swing arm being parallel with the landing surface; the side brace arm extending laterally from the first end of the side brace arm to the second end of the side brace arm and being parallel to the landing surface; and a side of the kingpin being perpendicular to the landing surface.

F: The landing system of any of paragraphs A-E, wherein the aircraft is configured for conventional take-off and landing and vertical take-off and landing.

G: The landing system of any of paragraphs A-F, wherein the suspension assembly extends from the fuselage and is at least partially enclosed within one or more fairings.

H: The landing system of any of paragraphs A-G, wherein the one or more fairings comprise one or more segments, each segment comprising a revolved surface.

I: An aircraft comprising: one or more fairings; a fuselage; and a landing system, the landing system comprising: a strut located within the fuselage of the aircraft; and a suspension assembly comprising: a swing arm being pivotally coupled to the strut on a first end and external to the fuselage, pivotally coupled to the fuselage at a second end, and pivotally coupled to a kingpin at third end; a side brace arm pivotally coupled to the fuselage at a first end and pivotally coupled to a kingpin at a second end; and the kingpin being coupled to an axle, the axle being couple to a wheel included as part of a wheel, tire, brake assembly, wherein the suspension assembly is configured to enable an upward movement of the wheel along a path near perpendicular to a landing surface.

J: The aircraft of paragraph I, wherein the strut comprises an oleo-pneumatic strut.

K: The aircraft of any of paragraphs I-J, wherein the landing system is positionable in a first position to a second position.

L: The aircraft of any of paragraphs I-K, wherein the first position comprises an extended position, wherein: the strut is angled at an incline relative to an x-axis and the landing surface; a first portion of the swing arm between the first end of the swing arm and the second end of the swing arm being angled at a second incline relative to the x-axis and the landing surface, a second portion of the swing arm extending in a downward and lateral direction relative to the x-axis from the second end of the swing arm to the third end of the swing arm; the side brace arm extending from the first end of the side brace arm to the second end of the side brace arm at a lateral and downward angle relative to the landing surface; and a side of the kingpin being perpendicular to the landing surface.

M: The aircraft of any of paragraphs I-L, wherein the second position comprises a compressed position, wherein: the strut is compress in a downward and angled direction relative to an x-axis and the landing surface; a first portion of the swing arm between the first end of the swing arm and the second end of the swing arm being angled in a downward and lateral direction relative to the x-axis and the landing surface, a second portion of the swing arm extending from the second end of the swing arm to the third end of the swing arm being parallel with the landing surface; the side brace arm extending laterally from the first end of the side brace arm to the second end of the side brace arm and being parallel to the landing surface; and a side of the kingpin being perpendicular to the landing surface.

N: The aircraft of any of paragraphs I-M, wherein the aircraft is configured for conventional take-off and landing and vertical take-off and landing.

O: The aircraft of any of paragraphs I-N, wherein the suspension assembly extends from the fuselage and is at least partially enclosed within the one or more fairings.

P: The aircraft of any of paragraphs I-O, wherein the one or more fairings comprise one or more segments, each segment comprising a revolved surface.

Q: The aircraft of any of paragraphs I-P, wherein the landing system further comprises a sensor coupled to a portion of the swing arm and is enclosed within the fuselage, the sensor being configured to detect whether the aircraft is in contact with the landing surface.

R: A landing component of an aircraft comprising: a strut located within a fuselage of the aircraft; and a suspension assembly located external to the fuselage and housed within one or more fairings, the suspension assembly comprising: a swing arm being pivotally coupled to the strut on a first end and external to the fuselage, pivotally coupled to the fuselage at a second end, and pivotally coupled to a kingpin at third end; a side brace arm pivotally coupled to the fuselage at a first end and pivotally coupled to a kingpin at a second end; and the kingpin being coupled to an axle, the axle being coupled to a wheel included as part of a wheel, tire, brake assembly, wherein the landing component is configured to cause the suspension assembly to move an upward movement of the wheel from a first position to a second position along a path near perpendicular to a landing surface with a minimal change along a lateral position of the wheel.

S: The landing component of paragraph R, wherein the one or more fairings articulate as the suspension assembly moves from the first position to the second position.

T: The landing component of any of paragraphs R-S, wherein the one or more fairings comprise a fiberglass material.

What is claimed is:

1. A landing system of an aircraft configured to minimize camber and tire scrub, the landing system comprising:

a strut located within a fuselage of the aircraft; and a suspension assembly comprising:

a swing arm being pivotally coupled to the strut on a first end and external to the fuselage, pivotally coupled to the fuselage at a second end, and pivotably coupled to a kingpin at third end;

a side brace arm pivotally coupled to the fuselage at a first end and pivotally coupled to a kingpin at a second end; and the kingpin being coupled to a landing wheel assembly comprising a wheel and a brake assembly, wherein the suspension assembly is configured to enable an upward movement of the wheel along a path near perpendicular to a landing surface.

2. The landing system of claim 1, wherein the strut comprises an oleo-pneumatic strut.

3. The landing system of claim 1, wherein the landing system is positionable in a first position to a second position.

4. The landing system of claim 3, wherein the first position comprises an extended position, wherein:

the strut is angled at an incline relative to an x-axis and the landing surface;

a first portion of the swing arm between the first end of the swing arm and the second end of the swing arm being angled at a second incline relative to the x-axis and the landing surface, a second portion of the swing arm extending in a downward and lateral direction relative to the x-axis from the second end of the swing arm to the third end of the swing arm;

the side brace arm extending from the first end of the side brace arm to the second end of the side brace arm at a lateral and downward angle relative to the landing surface; and a side of the kingpin being perpendicular to the landing surface.

5. The landing system of claim 3, wherein the second position comprises a compressed position, wherein:

the strut is compressed in a downward and angled direction relative to an x-axis and the landing surface;

a first portion of the swing arm between the first end of the swing arm and the second end of the swing arm being angled in a downward and lateral direction relative to the x-axis and the landing surface, a second portion of the swing arm extending from the second end of the swing arm to the third end of the swing arm being parallel with the landing surface;

the side brace arm extending laterally from the first end of the side brace arm to the second end of the side brace arm and being parallel to the landing surface; and a side of the kingpin being angled relative to the x-axis.

6. The landing system of claim 1, wherein the aircraft is configured for conventional take-off and landing and vertical take-off and landing.

7. The landing system of claim 1, wherein the suspension assembly extends from the fuselage and is at least partially enclosed within one or more fairings.

8. The landing system of claim 7, wherein the one or more fairings comprise one or more segments, each segment comprising a revolved surface.

9. An aircraft comprising:

one or more fairings;

a fuselage; and a landing system, the landing system comprising:

a strut located within the fuselage of the aircraft; and a suspension assembly comprising:

a swing arm being pivotally coupled to the strut on a first end and external to the fuselage, pivotally coupled to the fuselage at a second end, and pivotally coupled to a kingpin at third end;

a side brace arm pivotally coupled to the fuselage at a first end and pivotally coupled to a kingpin at a second end; and the kingpin being coupled to an axle, the axle being coupled to a wheel included as part of a wheel, tire, brake assembly, wherein the suspension assembly is configured to enable an upward movement of the wheel along a path near perpendicular to a landing surface.

10. The aircraft of claim 9, wherein the strut comprises an oleo-pneumatic strut.

11. The aircraft of claim 9, wherein the landing system is positionable in a first position to a second position.

12. The aircraft of claim 11, wherein the first position comprises an extended position, wherein:

the strut is angled at an incline relative to an x-axis and the landing surface;

a first portion of the swing arm between the first end of the swing arm and the second end of the swing arm being angled at a second incline relative to the x-axis and the landing surface, a second portion of the swing arm extending in a downward and lateral direction relative to the x-axis from the second end of the swing arm to the third end of the swing arm;

the side brace arm extending from the first end of the side brace arm to the second end of the side brace arm at a lateral and downward angle relative to the landing surface; and a side of the kingpin being perpendicular to the landing surface.

13. The aircraft of claim 11, wherein the second position comprises a compressed position, wherein:

the strut is compressed in a downward and angled direction relative to an x-axis and the landing surface;

a first portion of the swing arm between the first end of the swing arm and the second end of the swing arm being angled in a downward and lateral direction relative to the x-axis and the landing surface, a second portion of the swing arm extending from the second end of the swing arm to the third end of the swing arm being parallel with the landing surface;

the side brace arm extending laterally from the first end of the side brace arm to the second end of the side brace arm and being parallel to the landing surface; and a side of the kingpin being angled relative to the x-axis.

14. The aircraft of claim 9, wherein the aircraft is configured for conventional take-off and landing and vertical take-off and landing.

15. The aircraft of claim 9, wherein the suspension assembly extends from the fuselage and is at least partially enclosed within the one or more fairings.

16. The aircraft of claim 9, wherein the one or more fairings comprise one or more segments, each segment comprising a revolved surface.

17. The aircraft of claim 9, wherein the landing system further comprises a sensor coupled to a portion of the swing arm and is enclosed within the fuselage, the sensor being configured to detect whether the aircraft is in contact with the landing surface.

18. A landing component of an aircraft comprising:

a strut located within a fuselage of the aircraft; and a suspension assembly located external to the fuselage and housed within one or more fairings, the suspension assembly comprising:

a swing arm being pivotally coupled to the strut on a first end and external to the fuselage, pivotally coupled to the fuselage at a second end, and pivotally coupled to a kingpin at third end;

a side brace arm pivotally coupled to the fuselage at a first end and pivotally coupled to a kingpin at a second end; and the kingpin being coupled to an axle, the axle being coupled to a wheel included as part of a wheel, tire, brake assembly, wherein the landing component is configured to cause the suspension assembly to move an upward movement of the wheel from a first position to a second position along a path near perpendicular to a landing surface with a minimal change along a lateral position of the wheel.

19. The landing component of claim 18, wherein the one or more fairings articulate as the suspension assembly moves from the first position to the second position.

20. The landing component of claim 18, wherein the one or more fairings comprise a fiberglass material.

* * * * *